Patented Apr. 23, 1946

2,398,943

UNITED STATES PATENT OFFICE 2,398,943

HYDRAULIC FLUID AND LUBRICATING OIL

Myron H. Kollen, Long Beach, Calif., assignor to Union Oil Company of California, Los Angeles, Calif., a corporation of California No Drawing. Application September 22, 1941, Serial No. 411,903

8 Claims. (Cl. 252—73)

This invention relates to the production of a composition of matter suitable as an hydraulic fluid and certain lubricating oil purposes.

Many hydraulic fluids now in use are produced from petroleum products. Some of these fluids are made by the redistillation of petroleum spray oils to produce a product having the desired viscosity which is subsequently refined to result in a fluid having a desirable pour point, viscosity-temperature susceptibility, flash point and a low viscosity gravity constant in order to minimize the swelling effect of the fluid on natural or synthetic rubber.

Many of the hydraulic fluids now in use do not possess a low enough pour point to be suitable for use in hydraulic systems of aeroplanes which are employed in substratosphere use in which extremely low temperatures are encountered. Furthermore, for such uses where extreme temperatures are encountered it is desirable to use fluids in the hydraulic systems which exhibit a minimum change in viscosity with a given change in temperature. It is also desirable that such fluids possess a relatively high flash point as an added factor of safety.

It is the object of the present invention to compound a fluid which is highly suitable for hydraulic systems to be used under extreme temperature conditions, i. e., subjected to a wide temperature range and which at the lower temperature range of use are still in the form of a fluid. It is a further object of this invention to produce a compounded fluid having a low viscosity gravity constant, a very low pour point and a relatively high flash point.

The base material which I employ in my new composition of matter consists essentially of hydrocarbons which are isoparaffinic in character and which may be produced by reacting olefins with isoparaffins under the influence of pressure and heat, as described in the article appearing in the Ind. Eng. Chem. 1936, vol. 28, page 1439. This base material may also be produced by catalytically reacting olefins and isoparaffins, for example low boiling olefins such as butenes and pentenes, with an isoparaffin such as isobutane in the presence of a catalyst such as concentrated sulfuric acid and a mixture of concentrated phosphoric acid and sulfuric acid, chlorsulfonic acid or aluminum chloride.

The following method may be used for the production of the high boiling hydrocarbon compounds used as a base in my new composition of matter. Into a vessel equipped with an agitating device there is introduced 5 parts of a low boiling isoparaffin such as isobutane. Into the same vessel there is also introduced 5 parts of concentrated sulfuric acid of about 98% $H_2SO_4$. While agitating the sulfuric acid and low boiling isoparaffin in the agitator at a temperature of about 60° F. there is slowly added 1 part of an olefin mixture consisting essentially of butenes and pentenes. After thoroughly agitating the mixture of sulfuric acid, isoparaffins and olefins for a period of three hours the mixture is allowed to settle and the hydrocarbon phase is decanted away from the acid phase. The hydrocarbon phase is placed in a still and all of the materials contained in this phase boiling up to 475° F. or higher, depending upon the final viscosity desired are removed. The proportion of high boiling materials is materially influenced by the nature of the stocks and the temperature used, a temperature somewhat lower than 60° F. often favors the production of higher boiling materials.

If the distillation is stopped so as to produce a product having a viscosity of approximately 50 Saybolt Universal seconds the distillation bottoms will have the following characteristics:

| | |
|---|---|
| Boiling range °F | 450 to 700 |
| Gravity | 39.8 |
| Flash C. O. C °F | 215 |
| Fire °F | 255 |
| Pour point, fluid at °F | −75 |
| Vis. 100° F. S. U. sec | 50.5 |
| Vis. 130° F. S. U. sec | 41.3 |
| Viscosity index | 0 |
| Vis. gravity constant | .796 |
| Color (NPA) | 1− |

Viscosity gravity relation was first discussed by Hill and Coats in the Ind. Eng. Chem., vol. 20, June 1928, pages 641–644. Regular chart used in given in the Analytical Edition, page 144, April 15, 1931.

Viscosity temperature relationship has been discussed by Dean and Davis in Chem. and Met. Eng., vol. 36, October 1929, pages 618–619.

The distillation bottoms have a clear light yellow color, mild odor, a very low pour point and, surprisingly, although having a very low viscosity gravity constant also possess a relatively low viscosity index. Furthermore, this material has been found to have very little swelling effect upon many types of synthetic rubbers now employed.

This material is, however, characterized by being highly susceptible to an increasing of its viscosity index by the addition of certain polymers now sold on the market which are produced by polymerizing low boiling olefins, particularly isobutylene, in the presence of catalysts, such as aluminum chloride or boron trifluoride. These polymers which have molecular weights in the order of 10,000 to 100,000 and even higher are described in Ind. Eng. Chem. 32 (1940) page 299 by Thomas and others.

Table I, set forth below, indicates the viscosity index of the original alkylation bottoms stock with and without the addition of the polymerized product which has a molecular weight in the order of 12,000. From this table it will be noted that the viscosity index of the original stock was in the order of zero, whereas that of the stock containing ½% of the polymer having molecular weight of 12,000 was in the order of 55. When 1% of the polymer having a molecular weight of 12,000 was added to the original stock the viscosity index rises to 110.

This can be more effectively shown by plotting the increase in viscosity index against the percent of polymer added, and comparing this to a regular oil.

Table I

|  | Vis. at 100° F. Saybolt Universal | Vis. at 130° F. Saybolt Universal | Vis. at 210° F. Saybolt Universal | Viscosity index |
|---|---|---|---|---|
| Original stock | 42.1 | 37.0 | Approx. 31 | About 0 |
| +½% polymer (mol. wt. 12,000) | 47.1 | 40.0 | Approx. 32.7 | About 55 |
| +1% polymer (mol. wt. 12,000) | 53.0 | 43.4 | 34.2 | About 110 |

Table II represents the treatment of the alkylation bottoms with the polymerized material referred to above having molecular weight in the order of 100,000. From this table it will be noted that ½% of the polymer having a molecular weight of 100,000 raises the viscosity index to about 150 and if this amount is increased to 1% the viscosity index rises to 210.

Table II

|  | Vis. at 100° F. Saybolt Universal | Vis. at 130° F. Saybolt Universal | Vis. at 210° F. Saybolt Universal | Viscosity index |
|---|---|---|---|---|
| Original stock | 42.1 | 37.0 | Approx. 31 | About 0 |
| +½% polymer mol. wt. 100,000 | 49.0 | 42.0 | 34.3 | About 150 |
| +1% polymer mol. wt. 100,000 | 74.9 | 57.3 | 40.4 | 210 |

While the character of the invention has been described in detail and numerous examples of the composition given, this has been done by way of illustration only and with the intention that no limitation should be imposed on the invention thereby. It will be apparent to those skilled in the art that numerous modifications may be made without departing from the scope of the following claims.

I claim:

1. A composition of matter comprising a major proportion of a high boiling isoparaffin produced by reacting an olefin with a low boiling isoparaffin blended with a small quantity sufficient to change the viscosity index thereof substantially of a polymer of a low boiling olefin, said polymer having a molecular weight above about 10,000.

2. A composition of matter comprising a major proportion of a high boiling hydrocarbon produced as a residual isoparaffinic fraction from the alkylation of a low boiling isoparaffin with an olefin blended with a small amount sufficient to change the viscosity index thereof substantially of a polymer of a low boiling olefin, said polymer having a molecular weight above about 10,000.

3. A composition of matter comprising a major proportion of a high boiling residual isoparaffinic fraction obtained by the distillation of the reaction product of a low boiling isoparaffin with an olefin in the presence of a catalyst such as concentrated sulfuric acid, blended with a small quantity sufficient to change the viscosity index thereof substantially of a polymer of a low boiling olefin, said polymer having a molecular weight above about 10,000.

4. A composition of matter comprising a major proportion of a relatively high boiling hydrocarbon isoparaffinic fraction produced by the alkylation of a low boiling isoparaffin with an olefin blended with a small quantity sufficient to change the viscosity index thereof substantially of a polymer of a low boiling olefin, said polymer having a molecular weight above about 10,000.

5. A composition of matter comprising a major proportion of a high boiling hydrocarbon isoparaffinic fraction produced by the alkylation of a low boiling isoparaffin with an olefin and having a boiling range in the order of from 450° F. to 700° F. blended with a small amount sufficient to change the viscosity index thereof substantially of a polymer of a low boiling olefin, said polymer having a molecular weight in the order of from 10,000 to 100,000.

6. An hydraulic fluid suitable for operation at extremely low temperatures which comprises a major proportion of a high boiling isoparaffinic hydrocarbon fraction produced by the alkylation of a low boiling isoparaffin with an olefin, and a small quantity sufficient to change the viscosity index thereof substantially of a butene polymer having a molecular weight between about 10,000 and 100,000.

7. An hydraulic fluid suitable for operation at extremely low temperatures which comprises a major proportion of an isoparaffinic hydrocarbon fraction boiling between 450° F. and 700° F. and a small quantity sufficient to change the viscosity index thereof substantially of a polymer of a low boiling olefin, said polymer having a molecular weight above about 10,000.

8. An hydraulic fluid suitable for operation at extremely low temperatures which comprises a major proportion of an isoparaffinic hydrocarbon fraction boiling between 450° F. and 700° F. and about ½ to 1% of an isobutylene polymer having a molecular weight above about 10,000.

MYRON H. KOLLEN.